(12) United States Patent
May et al.

(10) Patent No.: US 10,721,579 B2
(45) Date of Patent: Jul. 21, 2020

(54) CORRELATED CROSS-FEED OF AUDIO AND VIDEO

(71) Applicant: MOTOROLA SOLUTIONS, INC., Chicago, IL (US)

(72) Inventors: Philip E. May, Palatine, IL (US); Daniel A. Law, Glencoe, IL (US); Kang Bum Lee, Des Plaines, IL (US); Shwetal S. Parikh, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/182,502

(22) Filed: Nov. 6, 2018

(65) Prior Publication Data
US 2020/0145774 A1 May 7, 2020

(51) Int. Cl.
*H04R 5/00* (2006.01)
*H04S 7/00* (2006.01)
*H04N 7/18* (2006.01)
*H04N 21/43* (2011.01)
*H04N 5/232* (2006.01)
*H04R 5/02* (2006.01)

(52) U.S. Cl.
CPC ........... *H04S 7/30* (2013.01); *H04N 5/23218* (2018.08); *H04N 7/181* (2013.01); *H04N 21/4307* (2013.01)

(58) Field of Classification Search
CPC ...... H04S 7/30; H04N 5/23218; H04N 7/181; H04N 21/4307
USPC .................................................... 381/17, 306
See application file for complete search history.

(56) References Cited

U.S. PATENT DOCUMENTS 5,729,471 A 3/1998 Jain et al.
6,317,776 B1 11/2001 Broussard et al.
(Continued)

FOREIGN PATENT DOCUMENTS

WO 2007059301 5/2007

OTHER PUBLICATIONS

Chan, "Chinese cities wanting peace and quiet are using acoustic cameras to catch honking drivers," article (Apr. 23, 2018) 3 pages, http://www.businessinsider.com/china-using-acoustic-cameras-to-catch-car-honking-2018-4?IR=T.
(Continued)

*Primary Examiner* — Vivian C Chin
*Assistant Examiner* — Ammar T Hamid
(74) *Attorney, Agent, or Firm* — Michael Best & Friedrich LLP (57) ABSTRACT

Methods and systems for correlating cross-feed of audio and video. One system includes a display and an electronic processor connected to the display. The electronic processor is configured to receive a plurality of videos and a plurality of audio feeds, present an initial arrangement including one or more of the plurality of videos on the display, and generate a soundscape based on the initial arrangement, the soundscape including one or more of the plurality of audio feeds. The electronic processor is further configured to determine which of the videos of the plurality of videos contains a predetermined item of interest, determine which of the audio feeds of the plurality of audio feeds contains audio associated with the predetermined item of interest, and adjust the initial arrangement and the soundscape to highlight the predetermined item of interest.

10 Claims, 5 Drawing Sheets

(56) References Cited

U.S. PATENT DOCUMENTS

| | | |
|---|---|---|
| 8,681,203 B1 | 3/2014 | Yin et al. |
| 9,761,057 B2 | 9/2017 | Salter et al. |
| 2002/0093531 A1* | 7/2002 | Barile .................. H04N 7/142 715/753 |
| 2005/0041819 A1 | 2/2005 | Brown |
| 2005/0164787 A1 | 7/2005 | Connelly |
| 2008/0204569 A1* | 8/2008 | Miller ................ G06K 9/00711 348/222.1 |
| 2009/0116652 A1 | 5/2009 | Kirkeby et al. |
| 2010/0002069 A1* | 1/2010 | Eleftheriadis .......... H04N 7/152 348/14.08 |
| 2014/0324845 A1 | 10/2014 | Bronstein et al. |
| 2015/0191075 A1 | 7/2015 | Fueller et al. |
| 2017/0301371 A1 | 10/2017 | Anand et al. |

OTHER PUBLICATIONS

Doll et al., "Development of Simulated Directional Audio for Cockpit Applications," report, AAMRILTR-86-O14 (Jan. 1986) 230 pages, Systems Engineering Laboratory Georgia Tech Research Institute, Georgia Institute of Technology.

Intel, Unattended Baggage Detection Using Deep Neural Networks in Intel® Architecture, article, (Jul. 14, 2017) 11 pages, https://software.intel.com/en-us/articles/unattended-baggage-detection-using-deep-neural-networks-in-intel-architecture.

Linner, "Fire detection in video," journal, Visions & Graphics Group (2018) 5 pages, https://vgg.fiit.stuba.sk/2015-02/2755/.

Sivasubramanian, Invent 2016: Machine Learning State of the Union Mini Con (MAC206), Youtube, (Published Dec. 3, 2016) AI and Deep Learning at Amazon Web Services (AWS), https://youtu.be/HqsUfyu0XJc?t=30m26s.

* cited by examiner

FIG. 4

CORRELATED CROSS-FEED OF AUDIO AND VIDEO

BACKGROUND OF THE INVENTION

A public safety emergency operator, call-taker, dispatcher, and the like responding to an incident may be tasked with reviewing multiple videos and audio recordings from numerous sources. The multiple videos may be reviewed during or subsequent to the incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel and vehicles used by public safety personnel may be equipped with audio and video recording devices to record audio and video of an incident. For example, public safety personnel may use body worn cameras, helmet cameras, or smart glasses equipped with microphones and imaging sensors to capture audio and video of their environment and of the actions that occur while responding to an incident. In addition, other cameras (for example, traffic cameras, surveillance cameras, vehicle dash cameras, microphones, and the like) may capture audio and video of an incident. Audio and video may also be captured by civilians, for example, using smart telephones, and by building surveillance systems. The captured video and audio may include items of interest (described in more detail below) located at the scene of the incident. In some instances, the effectiveness of the response to the incident or the safety of public safety personnel at the incident may depend on whether the incident is under adequate visual surveillance.

Intelligence operators, dispatchers, emergency call takers, and the like are often tasked with reviewing both audio and video from such recording devices. In some instances, (for example, during a large incident) the number and variety of audio and video feeds may become large and personnel reviewing the audio and video may become overwhelmed, reducing the efficiency and effectiveness in reviewing and analyzing the audio and video.

Disclosed are, among other things, are automated mechanisms for assisting in the review and analysis of audio and video. One embodiment provides a system for correlating cross-feed of audio and video. One system includes a display and an electronic processor connected to the display. The electronic processor is configured to receive a plurality of videos and a plurality of audio feeds, present an initial arrangement including one or more of the plurality of videos on the display, and generate a soundscape based on the initial arrangement, the soundscape including one or more of the plurality of audio feeds. The electronic processor is further configured to determine which of the videos of the plurality of videos contains a predetermined item of interest, determine which of the audio feeds of the plurality of audio feeds contains audio associated with the predetermined item of interest, and adjust the initial arrangement and the soundscape to highlight the predetermined item of interest.

Another example embodiment provides a method for correlating cross-feed of audio and video. The method includes receiving a plurality of videos and a plurality of audio feeds, presenting an initial arrangement including one or more of the plurality of videos on a display, and generating a soundscape based on the initial arrangement. The soundscape includes one or more of the plurality of audio feeds. The method further includes determining which of the videos of the plurality of videos contains a predetermined item of interest, determining which of the audio feeds of the plurality of audio feeds contains audio associated with the predetermined item of interest, and adjusting the initial arrangement and the soundscape to highlight the predetermined item of interest.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components. It should be understood that while the systems and methods described herein are in terms of public safety applications, it should be understood that such systems and methods may be applied to other types of applications.

Figure 1:
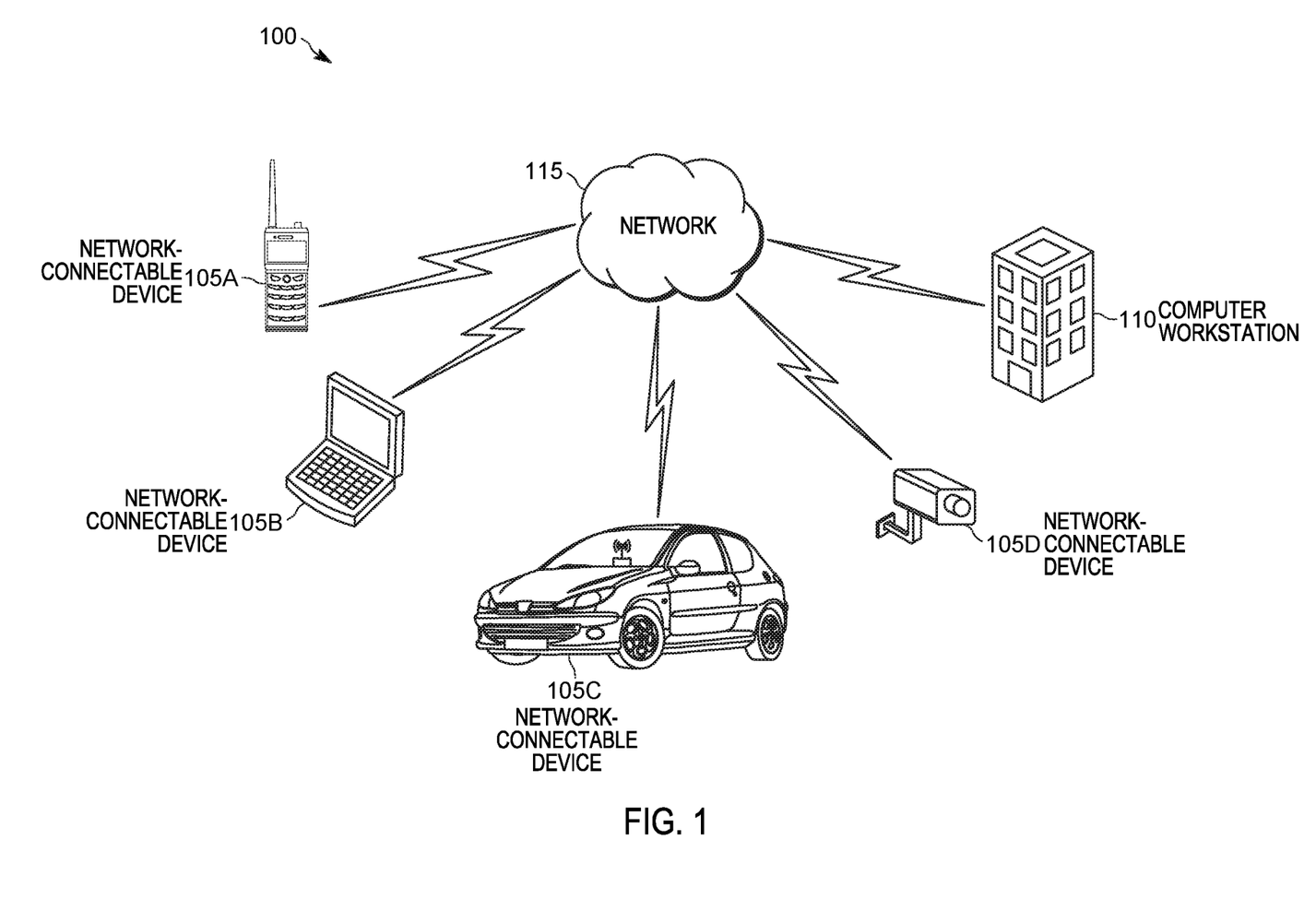
FIG. 1 is a diagram of a communications system in accordance with some embodiments.

FIG. 1 is a block diagram of a communication system 100 according to one example embodiment. The communication system 100 includes various network-connectable devices 105A through 105D and a computer workstation 110. As indicated by FIG. 1, the network-connectable devices 105A through 105D may be any one of a number of different types of network-connectable devices. Each of the network-connectable devices 105A through 105D are configured to transmit audio, video, or both to the computer workstation 110 via the network 115. One or more of the network-connectable devices 105A through network-connectable devices 105D may also be configured to record either or both audio and video. In the illustrated embodiment, the network-connectable device 105A is a portable communication device carried by a user (for example, a device carried by a police officer during patrol). In some embodiments, network-connectable device 105A is a smart telephone, a battery-powered portable radio, a body wearable camera, a biometric sensor, or similar device. As another example, the network-connectable device 105B is a laptop computer (illustrated in FIG. 1) that can receive input from a user via a keyboard, a touchscreen display, a microphone (for example, voice commands), and the like. In other embodiments, network-connectable device 105B is a tablet computer, a desktop computer, or a similar device. As another example, the network-connectable device 105C is a vehicle-mounted mobile communication device (for example, a communication device mounted in a police vehicle, a fire truck, an ambulance, a maintenance vehicle such as a tow truck, and the like) (also illustrated in FIG. 1). As yet another example, the network-connectable device 105D may be a surveillance camera monitoring a particular location, for example, a camera that is part of a building security system.

The types of network-connectable devices 105A through 105D described above and shown in FIG. 1 are merely examples. In other embodiments, the communication system 100 includes other types of network-connectable devices. One or more of the network-connectable device 105A through 105D, for example, may be the same type of device. In some embodiments, the communication system 100 includes more or fewer network-connectable devices than the quantity of network-connectable devices shown in FIG. 1.

Figure 2:
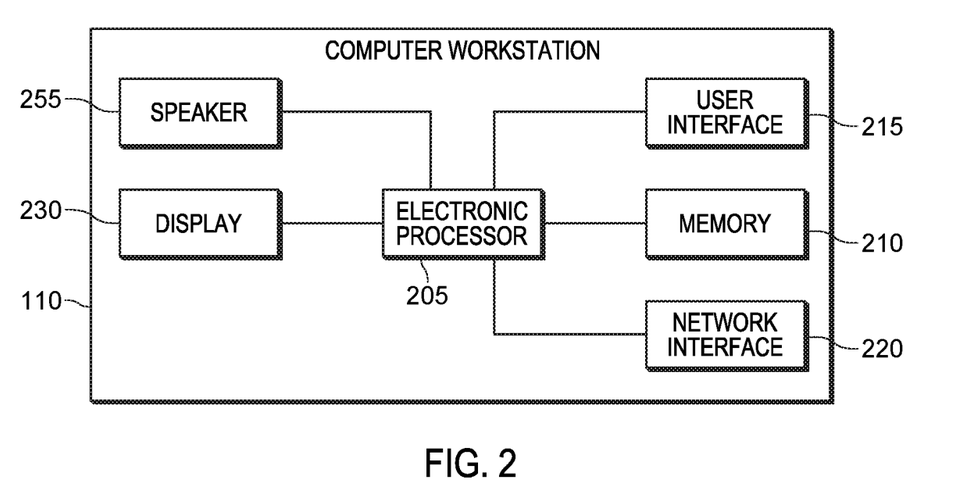
FIG. 2 is a diagram of a computer workstation included in the communications system of FIG. 1 in accordance with some embodiments.

The computer workstation 110, explained in more detail below in regard to FIG. 2, is configured to receive audio and video from each of the network-connectable devices 105A-105D. The computer workstation 110 may be part of a public safety monitoring facility. For example, the computer workstation 110 may be part of a security management office at a theme park or a public safety command center such as a police headquarters, fire station, dispatch center, public safety answering point (PSAP), operations center, command and control facility, and the like.

As mentioned above, the network-connectable devices 105A through 105D and the computer workstation 110 may communicate with each other over a network 115. The network-connectable devices 105A through 105D communicate with the computer workstation 110 (for example, by sending radio signals, receiving radio signals, or both) via corresponding network interfaces (for example, one or more transceiver circuits). The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Also as shown in FIG. 1, in some embodiments, the network-connectable devices 105A through 105D and the computer workstation 110 may communicate directly with each other via direct-mode wireless link(s) 125 using a communication channel or connection that is outside of the network 115. For example, the network-connectable devices 105A through 105D and the computer workstation 110 communicate directly with each other when they are within a predetermined distance from each other. Although FIG. 1 only shows direct-mode wireless links 125 between adjacent network-connectable devices 105, in some embodiments, any one of the network-connectable devices 105 and the computer workstation 110 is capable of communicating with another network-connectable device 105 or the computer workstation 110 via a direct-mode wireless link 125.

FIG. 2 is a diagram of the computer workstation 110. In the embodiment illustrated, the computer workstation 110 includes an electronic processor 205, a memory 210, a user interface 215, a network interface 220, an audio speaker 225, and a display 230. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the user interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein.

The user interface 215 is configured to receive input from a user of the computer workstation 110. The user interface 215 may include, for example, one or more input devices such as a mouse, a keyboard, a microphone, and the like. The electronic processor 205 is configured to perform one or more actions based on the input received from the one or more devices of the user interface 215. For example, in some embodiments, the electronic processor 205 is configured to execute one or more actions based on a voice command received via a microphone.

The electronic processor 205 is configured to control the network interface 220 to transmit and receive video, audio feeds, and other data to and from devices of the system 100 (for example, network-connectable devices 105A-105D). The network interface 220 transmits and receives radio signals to and from, for example, the network 115. The network interface 220 may include, for example, a transmitter and receiver pair, a transceiver, an antenna, or some combination thereof. The electronic processor 205 and the network interface 220 may include various digital and analog components, which for brevity are not described herein and which may be implemented in hardware, software, or a combination of both.

The audio speaker 225 is a transducer for producing sound from electrical signals (for example, generated from a received audio stream) received from the electronic processor 205. In some embodiments, the audio speaker 225 is integrated in a single housing with the other components (for example, with the display 230). In some embodiments, the audio speaker 225 is present in an accessory device (for example, a portable speaker or a headset or headphones worn by a user of the workstation 110) connected via a wired or wireless connection to the computer workstation 110.

As explained in more detail below, the workstation 110 is configured to output one or more audio feeds through the speaker 225 to produce a soundscape to a user of the workstation. The soundscape is a generated acoustic environment that creates a custom, particular auditory sensation as perceived by an individual by customizing one or more settings of the audio and one or more of the sources outputting the audio based on their location relative to the individual. For example, the soundscape may output a sound such that the individual perceives that the source of the sound is at a location proximate from where the individual is positioned when the actual source outputting the sound is at a different location.

The display 230 is a suitable display, for example, a liquid crystal display (LCD) touch screen, or an organic light-emitting diode (OLED) touch screen. In some embodiments, the computer workstation 110 implements a graphical user interface (GUI) (for example, generated by the electronic processor 205, from instructions and data stored in the memory 210, and presented on the display 230), that enables a user to interact with the computer workstation 110.

The workstation 110 includes software and hardware to electronically detect and classify items within received videos (for example, videos from one or more of the devices 105A-105D). For example, the workstation 110 may include video processors and object classifier algorithms. In some embodiments, the detected items of interest are assigned object identifiers, and stored in the memory 210. The workstation 110 also includes software and hardware to electronically detect and classify sounds within received audio feeds (for example, audio feeds from one or more of the devices 105A-105D). For example, the workstation 110 may include audio recognition and voice recognition processors and audio classifier algorithms.

It should be understood that, in some embodiments, the computer workstation 110 includes fewer or additional components in configurations different from that illustrated in FIG. 2. For example, in some embodiments, as explained in more detail below, the computer workstation 110 includes multiple speakers, multiple displays, and combinations thereof.

Figure 3:
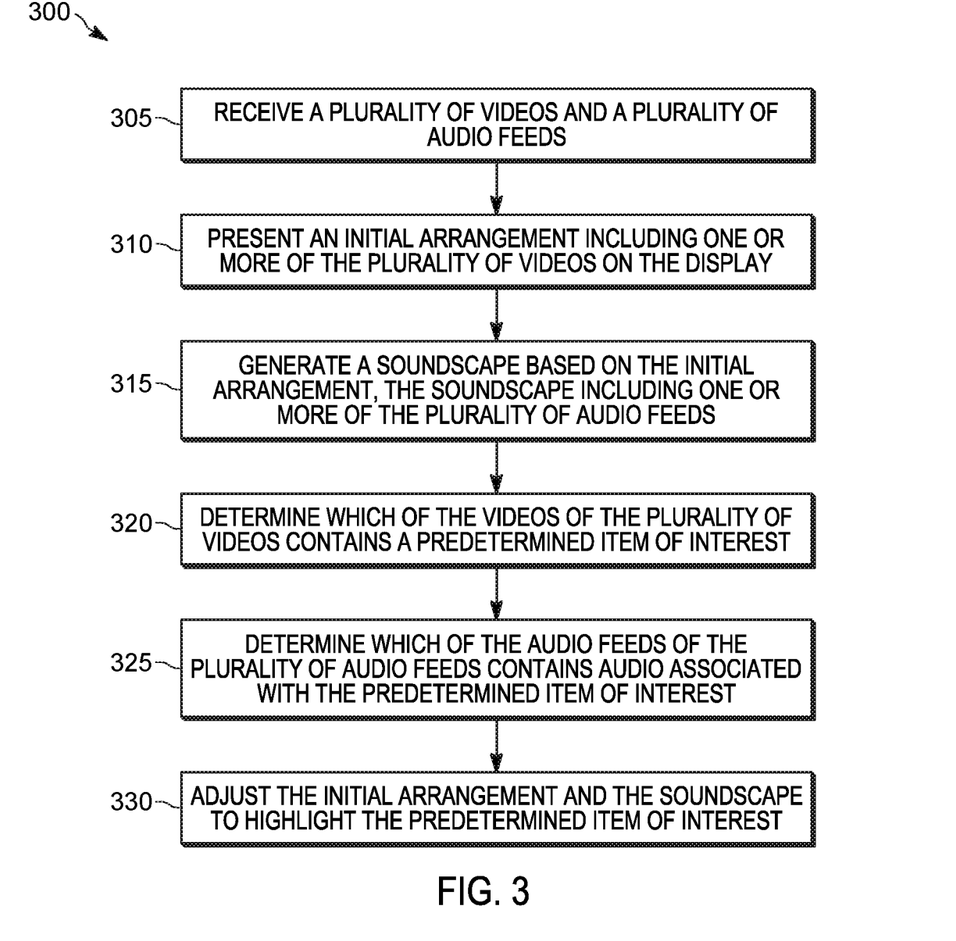
FIG. 3 is a flowchart of a method for correlating cross-feed of audio and video of the system of FIG. 1 in accordance with some embodiments.

FIG. 3 is a flowchart illustrating a method or procedure 300 for correlating cross-feed of audio and video. As an example, the method 300 is explained in terms of the computer workstation 110, in particular the electronic processor 205. However, it should be understood that portions of the method 300 may be distributed among multiple devices (for example, between the computer workstation 110 and one or more of the devices 105A-105D).

At block 305, the electronic processor 205 receive a plurality of videos and a plurality of audio feeds from one or more external devices (for example, the devices 105A-105D). As mentioned above, it should be understood that, while in the present example, the system 100 is described in terms of the devices 105A-105D that the computer workstation 110 may receive the plurality of videos and the plurality of audio feeds from a different number of devices.

Figure 4:
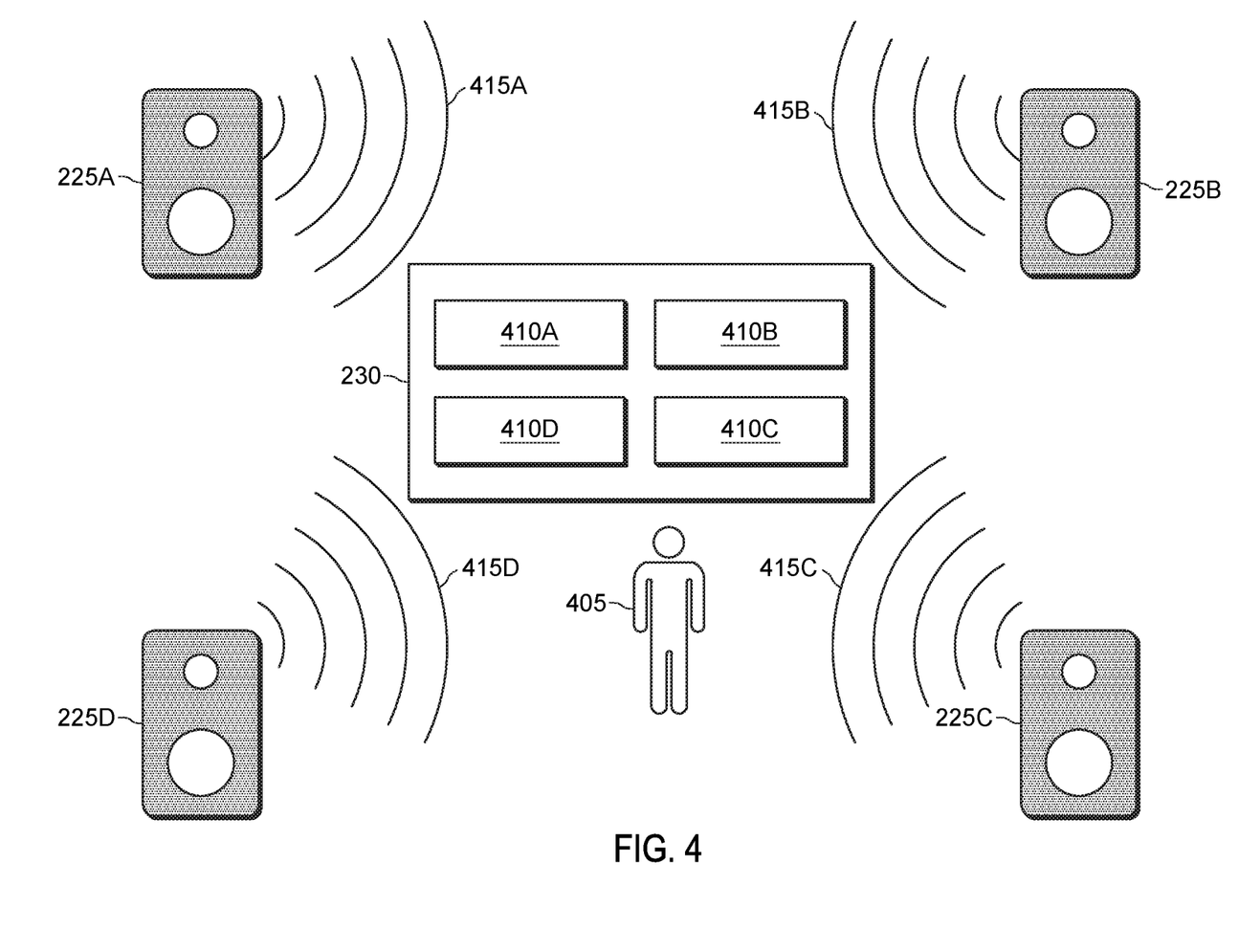
FIG. 4 is a diagram of the computer workstation of FIG. 2 in more detail and in accordance with some embodiments.

At block 310, the electronic processor 205 presents an initial arrangement including one or more of the plurality of videos on the display 230 and, at block 315, generates a soundscape based on the initial arrangement, the soundscape including one or more of the plurality of audio feeds. For example, FIG. 4 illustrates the computer workstation 110 (operated by a user 405) in accordance with some embodiments. As illustrated in FIG. 4, the display 230 displays videos 410A-410D in a first arrangement. In other words, each videos 410A-410D are located at a particular position on the display 230. The workstation 110 generates the soundscape to the user 405 based on the arrangement of the videos 410A-410D using the speakers 225A-225D. In particular, the workstation 110 outputs a received audio feed associated with the particular video of the videos 410A-410D through one or more of the speakers 225A-225D (audio outputs 415-415D) based on the location of the related video in the arrangement. For example, an audio feed related to the video 410A may be included in the audio outputs 415A, 415B, and 415D based on the location of the video 410A on the display 230. The resulting soundscape provides the user 405 the impression that the audio feed is coming from an area front and left from the user 405.

Each of the audio outputs 415A-415D may include more than one received audio feed, including audio feeds that are not associated with a video (in other words, purely recorded audio). The audio feed (or audio feeds) included within each audio output 415A-415D may be adjusted to produce a particular auditory effect in the soundscape (in other words, the location from which a particular audio feed is perceived by the user 405 to originate). For example, an audio balance, sound level, pitch, and the like of an audio feed may be adjusted. In some embodiments, more than one of the audio outputs 415A-415D includes one or more of the same audio feeds and may be adjusted differently.

As mentioned above, it should be understood that the workstation 110 may include more or less of one or more particular components. For example, although only one display is illustrated in FIG. 4, in some embodiments the workstation 110 includes more than one display 230.

Returning to FIG. 3, at block 320, the electronic processor 205 determines which of the videos of the plurality of videos contains a predetermined item of interest. The item of interest may be any object or audio, which is involved in or relevant to an investigation or other public safety operation (for example, responding to a crime, searching for a suspect, or locating a missing person). Items of interest within a video may include, for example, persons (for example, in the case of a criminal hunt or investigation) or automobiles (for example, in the case of a traffic accident). Items of interest within an audio feed may include, for example, voices of a particular person, a particular word or sound (for example, a cry for help, a siren, an alarm, or a gunshot), and the like. The item of interest in the one or more videos may be different but, in some embodiments, are related to the same incident. For example, when the incident is a stolen vehicle, the item of interest in a first video may be an identified suspect and the item of interest in a second video may be the stolen vehicle. The electronic processor 205 may identify which videos contain the predetermined item of interest using one or more object recognition methods (for example, the electronic processor 205 may use object classifiers to detect items in the videos). In the following description, the terms relevant video(s) and relevant audio feed(s) refer to videos and audio feeds, respectively, that are determined to include the predetermined item of interest.

At block 325, the electronic processor 205 determines which of the audio feeds of the plurality of audio feeds contains audio associated with the predetermined item of interest. Related audio may include, for example, a voice of a known suspect, a particular voice or sound, as described above, and the like. The electronic processor 205 may identify which audio feeds contain related audio using one or more audio recognition methods (for example, the electronic processor 205 may use audio classifiers to detect particular sounds, voices, or both in the audio feeds.

At block 330, the electronic processor 205 adjusts the initial arrangement and the soundscape to highlight the predetermined item of interest. In other words, the electronic processor 205 adjusts the arrangement of videos and the soundscape to direct the user's attention to a relevant video, relevant audio feed, or some combination thereof. The electronic processor 205 may adjust the initial arrangement on the display 230 to highlight the predetermined item of interest, for example, by generating, on the display 230, a visual indication relative to a video including the predetermined item of interest or changing a position of the one or more of the plurality of videos of the initial arrangement. The electronic processor 205, for example, may adjust a visual of the relevant video by adjusting the color or generating a highlight relative to the predetermined item of interest (adjusting the color of the predetermined item of interest, generating a circle around the item, and the like). The electronic processor 205 may further generate text overlaying the relevant video, the text including further details about the video, for example, a date, a time in which the video was originally recorded, a location that the video was originally recorded, an identifier of the device that recorded the video, and the like. Such information may be determined, for example, based on metadata received with the video. The electronic processor 205 may change the position, for example, by moving a relevant video to a center position on the display 230. The electronic processor 205 may also adjust the size of a video on the display, including videos that are determined to include the predetermined item of interest. The electronic processor 205 may remove or replace one or more videos including in the initial arrangement in response to determining that the one or more videos do not include the predetermined item of interest.

In one example, the electronic processor 205 adjusts the soundscape to highlight the predetermined item of interest by altering the soundscape to generate an impression that one or more of the plurality of audio feeds originates from a video that contains the predetermined item of interest. For example, when the video 410B is determined to include the predetermined item of interest, the soundscape is adjusted to emphasize the audio feed associated with the video 410B such that the sound of the audio feed is perceived by the user 405 as coming from where the video 410B is located on the display 230. The electronic processor 205 may adjust certain sounds in the relevant audio feed to highlight the predetermined item of interest. For example, the electronic processor 205 attenuates sounds in the audio feed that are not the predetermined item of interest (or relative to), like background noise. The electronic processor 205 may further adjust the soundscape to highlight the predetermined item of interest by attenuating one or more audio feeds of the soundscape. In one example, the electronic processor 205 decreases the sound level of one or more audio feeds that are determined to not include the predetermined item of interest. The electronic processor 205 may also adjust the soundscape to highlight the predetermined item of interest by generating an audio highlight within one or more of the plurality of audio feeds. An audio highlight may be a custom generated noise (for example, a beep, a chirp, or the like) or an adjustment in tone, pitch, or sound level of the audio feed.

In some embodiments, the workstation 110 displays only a portion of the videos received. In such embodiments, when a video containing the predetermined item of interest is not included in the initial arrangement, the electronic processor 205 generates an impression that an audio feed associated with the video containing the predetermined item of interest originates from a location away from (outside of) the display 230. Similarly, the workstation 110 may produce a soundscape including a portion of the audio feeds received. When an audio feed that is not originally part of the original soundscape (the soundscape of block 315) is determined to include the predetermined item of interest, the electronic processor 205 generates an impression that an audio feed associated with the video containing the predetermined item of interest originates from a location away from (outside of) the display 230. In either case, the electronic processor 205, as described in more detail below in regard to FIG. 5, may present a visual indicator (a graphic window, button, or the like) on the graphic interface of the display, prompting the user 405 to view or listen to the relevant video or audio feed (respectively) that is not present in the initial arrangement or original soundscape. In some embodiments, the electronic processor 205 generates the impression that the relevant audio feed originates from a location away from the display 230 but in a general direction or location where the visual indicator is located. For example, the electronic processor 205 generates the impression, to the user 405, that a relevant audio feed is at a bottom right location next to the display 230 while the visual indicator is displayed on the right hand corner of the display 230 (for example, overlaying the video 410C).

In some embodiments, the electronic processor 205 is also configured to determine a one or more additional videos from the plurality of videos that correlates to a video including the predetermined item of interest. The one or more additional videos may or may not include the predetermined item of interest. For example, an additional video may be determined to correlate to a relevant video based on a physical proximity of a video source of the additional video to a video source (for example, one of the devices 105A-105D) of the relevant video, a similarity of an element detected in the second video to the predetermined item of interest, a pan-tilt-zoom characteristic of the video source of the additional video, an estimated velocity of the element detected in the additional video, or an incident captured in the additional video. The electronic processor 205 may adjust the initial arrangement to highlight the additional video similar to the methods of highlighting as described above and further below. The additional video may or may not be included in the initial arrangement.

In some embodiments, the electronic processor 205 associates one or more of the videos and audio feeds with a priority level. The priority levels may be associated with particular items of interest, the type of media (whether the relevant media is a video or an audio feed), a confidence level that the video or audio feed includes a predetermined item of interest, and the like. The electronic processor 205 may adjust the soundscape and the initial arrangement to highlight the relevant audio feeds and videos that are determined to have a high priority level while also emphasizing, to a lesser degree, the relevant audio feeds and videos that are determined to have a lesser priority level. For example, the electronic processor 205 adjusts the initial arrangement to display the relevant videos of a high priority level at the center of the display 230 and displays the relevant videos of a lesser priority level around, but close to, the center of the display 230. For example, when the workstation 110 includes more than one display, the relevant videos of a lesser priority level may be displayed on the display(s) that are not directly in front of the user 405 (for instance, a display next to a first display). The electronic processor 205 may similarly adjust the soundscape such that the user 405 perceives the relevant audio feeds of a high priority are directly in front of or close to (or both) the user 405 while the relevant audio feeds of a lesser priority level are perceived to be approximately to the side of or slightly further away from (or both) the user 405.

Figure 5:
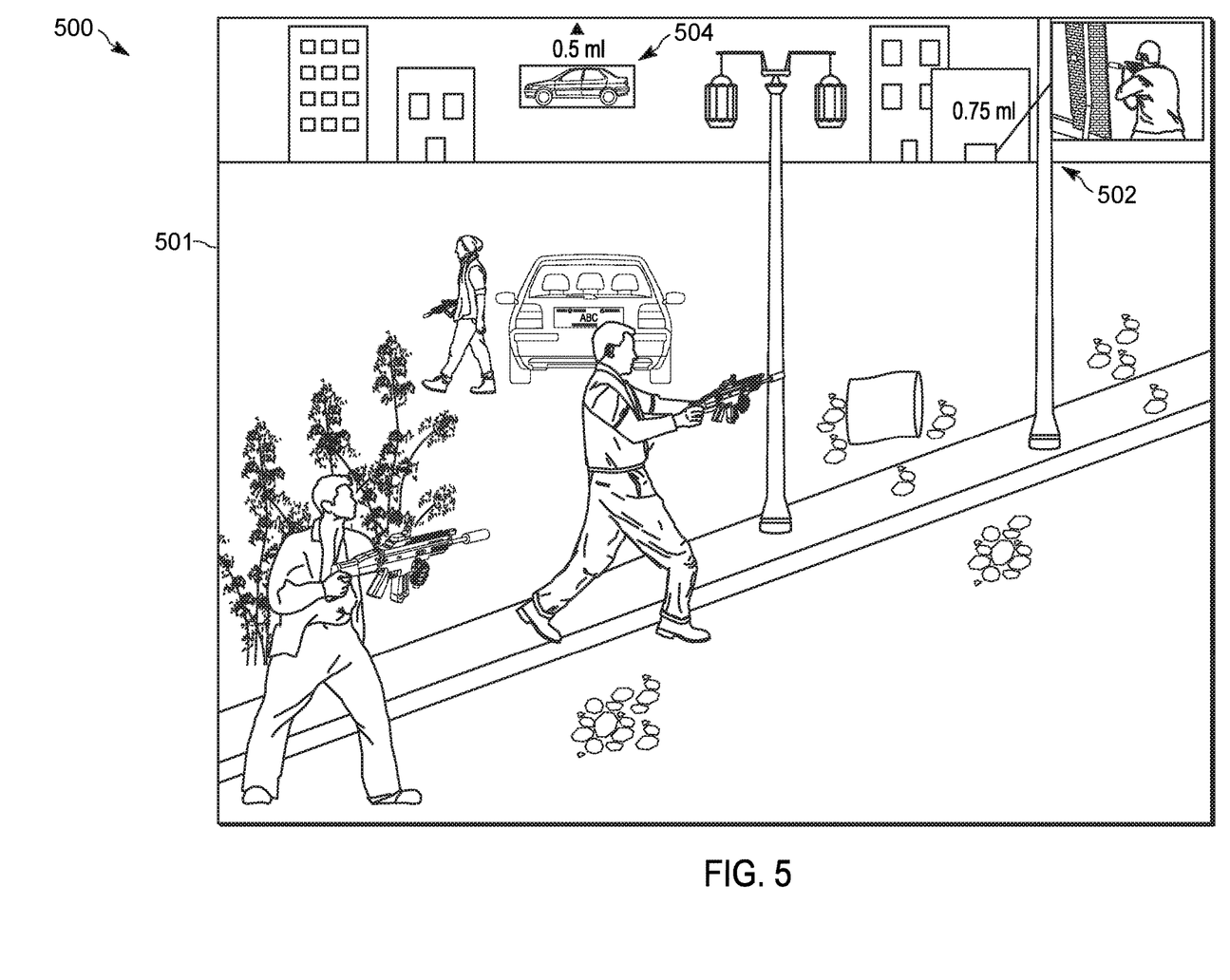
FIG. 5 is a graphic window of the workstation of FIG. 2 in accordance with some embodiments.

As mentioned above, one or more of the relevant (or associated) audio feeds and videos may not be included within the original soundscape or initial arrangement, respectively. Accordingly, in some embodiments, the electronic processor 205 generates, on the display 230, a visual indicator of the video or audio feed. FIG. 5 illustrates an example graphical user interface window 500 displayed on the display 230 of the workstation 110 in accordance with some embodiments. The window 500 includes a video 501 (for example, video 410A). The window 500 includes a visual indicator 502 in accordance with some embodiments. Although the visual indicator 502 is described in terms of a video, it should be understood that visual indicators associated with audio feeds may be configured similarly as those described below. More than one visual indicator may be generated overlaying a video of the display 230. For example, the window 500 includes the visual indicator 502 of one video and a second visual indicator 504 of a different video.

The visual indicator 502 is associated with a second video that is determined to be relevant (or associated with the video 501 of window 500) but that is not displayed in the initial arrangement of the display 230. As shown in the illustrated example, the visual indicator 502 includes a thumbnail of the second video. In embodiments where the visual indicator is associated with an audio feed, the visual indicator may include a playback window that plays a portion of the audio feed (for example, a sample of the audio that includes the item of interest). The visual indicator 502 further includes an indication of the direction of the location of where the video was recorded. In the illustrated embodiment, the visual indicator 502 further includes the distance of the location of where the video was recorded relative to the location of the recording of the video of window 500. In embodiments where the location of the second video is not included within the video 401, the direction indication may be directed to a side of the window 500 based on the location of the second video relative to the video 401 as shown with visual indicator 504.

In some embodiments, a size of the indicator may be based on a level of relevancy, a priority level, and the like. For example, the visual indicator 502 is larger than the visual indicator 504 because there is an active scene within the video of the visual indicator 502, suggesting a higher priority level than a priority level of the video of the visual indicator 504.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for correlating cross-feed of audio and video, the system comprising:
   a display; and
   an electronic processor connected to the display and configured to
      receive a plurality of videos and a plurality of audio feeds;
      present an initial arrangement including one or more of the plurality of videos on the display;
      generate a soundscape based on the initial arrangement, the soundscape including one or more of the plurality of audio feeds;
      determine which of the videos of the plurality of videos contains a predetermined item of interest;
      determine which of the audio feeds of the plurality of audio feeds contains audio associated with the predetermined item of interest;
      adjust the initial arrangement and the soundscape to highlight the predetermined item of interest; and
      generate, when a video containing the predetermined item of interest is not included in the initial arrangement, an impression that an audio feed associated with the video containing the predetermined item of interest originates from a location away from the display.

2. The system of claim 1, wherein adjusting the soundscape to highlight the predetermined item of interest includes at least one selected from the group consisting of altering the soundscape to generate an impression that one or more of the plurality of audio feeds originates from a video that contains the predetermined item of interest, attenuating one or more audio feeds of the soundscape, and generating an audio highlight within one or more of the plurality of audio feeds.

3. The system of claim 1, wherein adjusting the initial arrangement to highlight the predetermined item of interest includes at least one selected from the group consisting of generating, on the display, a visual indication relative to a video including the predetermined item of interest and changing a position of the one or more of the plurality of videos of the initial arrangement.

4. The system of claim 1, wherein the electronic processor is further configured to determine a second video from the plurality of videos that correlates to a video including the predetermined item of interest based on at least one selected from the group consisting of a physical proximity of a video source of the second video to a video source of the video including the predetermined item of interest, a similarity of an element detected in the second video to the predetermined item of interest, a pan-tilt-zoom characteristic of the video source of the second video, an estimated velocity of the element detected in the second video, and an incident captured in the second video and adjust the initial arrangement to highlight the second video.

5. The system of claim 4, wherein the second video is not included in the initial arrangement.

6. A method for correlating cross-feed of audio and video, the method comprising:
   receiving a plurality of videos and a plurality of audio feeds;
   presenting an initial arrangement including one or more of the plurality of videos on a display;
   generating a soundscape based on the initial arrangement, the soundscape including one or more of the plurality of audio feeds;
   determining which of the videos of the plurality of videos contains a predetermined item of interest;
   determining which of the audio feeds of the plurality of audio feeds contains audio associated with the predetermined item of interest;
   adjusting the initial arrangement and the soundscape to highlight the predetermined item of interest; and
   generating, when a video containing the predetermined item of interest is not included in the initial arrangement, an impression that an audio feed associated with the video containing the predetermined item of interest originates from a location away from the display.

7. The method of claim 6, wherein adjusting the soundscape to highlight the predetermined item of interest includes at least one selected from the group consisting of altering the soundscape to generate an impression that one or more of the plurality of audio feeds originates from a video that contains the predetermined item of interest, attenuating one or more audio feeds of the soundscape, and generating an audio highlight within one or more of the plurality of audio feeds.

8. The method of claim 6, wherein adjusting the initial arrangement to highlight the predetermined item of interest includes at least one selected from the group consisting of generating, on the display, a visual indication relative to a video including the predetermined item of interest and changing a position of the one or more of the plurality of videos of the initial arrangement.

9. The method of claim 6 further comprising determining a second video from the plurality of videos that correlates to a video including the predetermined item of interest based on at least one selected from the group consisting of a physical proximity of a video source of the second video to a video source of the video including the predetermined item of interest, a similarity of an element detected in the second video to the predetermined item of interest, a pan-tilt-zoom characteristic of the video source of the second video, an estimated velocity of the element detected in the second video, and an incident captured in the second video and adjusting the initial arrangement to highlight the second video.

10. The method of claim 9, wherein the second video is not included in the initial arrangement.

* * * * *